(12) United States Patent
Sakusabe

(10) Patent No.: US 7,417,960 B2
(45) Date of Patent: Aug. 26, 2008

(54) COMMUNICATION APPARATUS, COMMUNICATION SYSTEM, COMMUNICATION METHOD AND PROGRAM

(75) Inventor: Kenichi Sakusabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 11/008,546

(22) Filed: Dec. 9, 2004

(65) Prior Publication Data

US 2005/0152290 A1 Jul. 14, 2005

(30) Foreign Application Priority Data

Dec. 12, 2003 (JP) ............................. 2003-415145

(51) Int. Cl.
*H04L 5/16* (2006.01)
(52) U.S. Cl. ....................................... 370/296; 270/276
(58) Field of Classification Search ................. 370/276, 370/278, 279, 282, 293, 296, 297, 275, 310, 370/349
See application file for complete search history.

(56) References Cited

U.S. PATENT DOCUMENTS 6,005,849 A * 12/1999 Roach et al. ................. 370/276

FOREIGN PATENT DOCUMENTS

JP 2001 308947 11/2001

* cited by examiner

*Primary Examiner*—Brenda Pham
(74) *Attorney, Agent, or Firm*—Frommer Lawrence & Haug LLP; William S. Frommer

(57) ABSTRACT

A communication apparatus for performing half duplex communications has: a memory circuit storing transmission data; a transmission processing circuit generating a transmission frame; a transmission/reception processing circuit outputting as a transmission signal the transmission frame generated by the transmission processing circuit and generating a reception frame by receiving a transmission signal; and a transmission/reception managing circuit making the transmission processing circuit generate a transmission frame containing the transmission data in the confirmation response and supply the transmission frame to the transmission/reception processing circuit if a confirmation response to the reception of the transmission signal at the transmission/reception processing circuit is to be issued and if the transmission data is stored in the memory circuit.

14 Claims, 7 Drawing Sheets

FIG. 5A
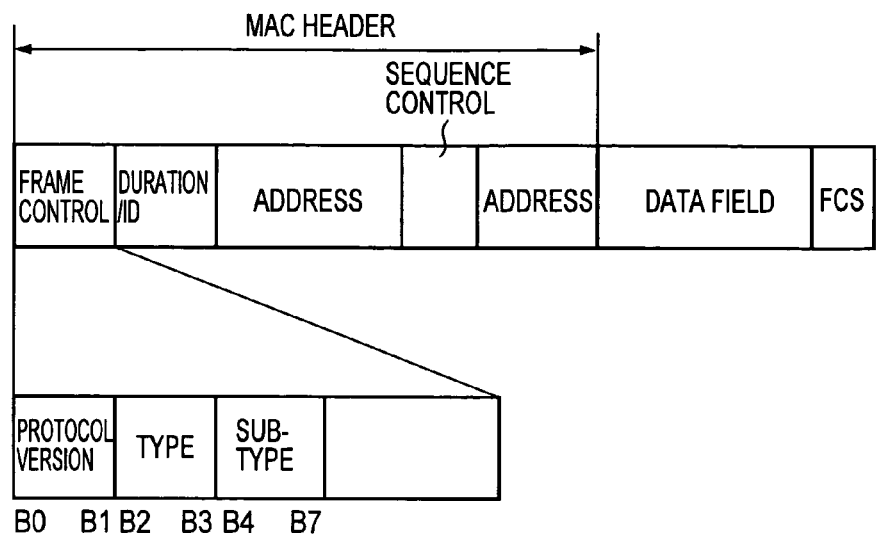
FIG. 5B
FIG. 6
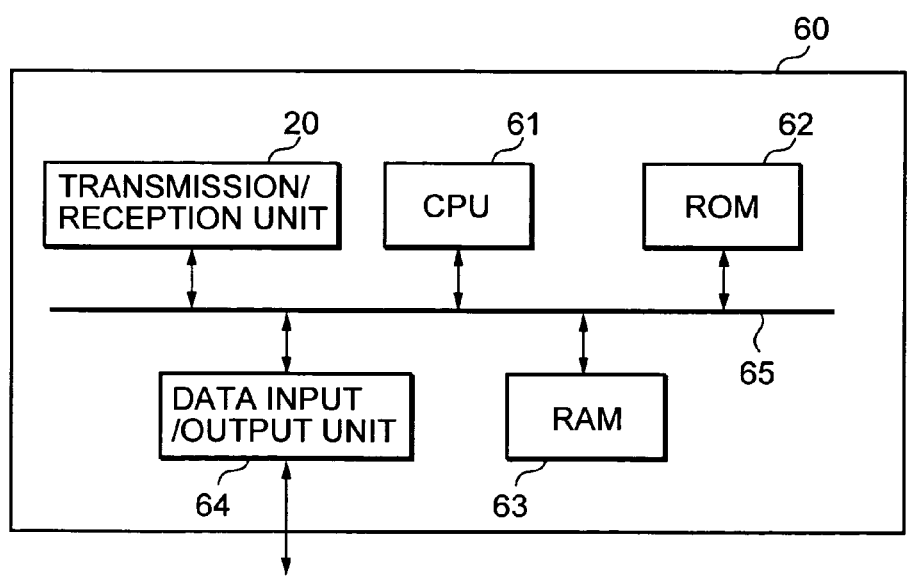

COMMUNICATION APPARATUS, COMMUNICATION SYSTEM, COMMUNICATION METHOD AND PROGRAM

CROSS REFERENCES TO RELATED APPLICATIONS

The present invention claims priority to its priority document No. 2003-415145 filed in the Japanese Patent Office on Dec. 12, 2003, the entire contents of which being incorporated by reference herein.

BACKGROUND OF THE INVENTION

1. Field of the Invention

The present invention relates to a communication apparatus, a communication system, a communication method and program. More particularly, if a confirmation response to the reception of a transmission signal is to be issued, if it is judged that transmission data is stored, the transmission data is added to the confirmation response to generate a transmission frame to be transmitted.

2. Description of the Related Art

A communication system for bidirectional data transmission uses full duplex communications capable of data transmission in two ways at the same time, and half duplex communications capable of data transmission only in one way at a time. As the communication system of half duplex communications, for example a wireless LAN (Local Area Network), a bus type network and the like are known.

In the communication system of half duplex communications of this type, in order to prevent collision of data transmitted from a plurality of users at the same time, it is checked before transmission whether transmission is under execution or whether data is now transmitted to its own apparatus, and if it is judged that there is no data collision, data transmission is executed.

The invention disclosed in Published Japanese translation of a PCT application No. 2003-523136 describes that in data transmission, not only a data packet but also a piggyback packet are transmitted, the piggyback packet including information on a physical layer system itself, transmission line characteristics of a communication network and the like.

SUMMARY OF THE INVENTION

For data transmission, not only data is transmitted but also a confirmation response representative of the reception of transmitted data is transmitted to a data transmission source, in order to confirm whether or not the data has been received at the transmission destination. Therefore, the next data transmission cannot be executed unless it is confirmed after the completion of the confirmation response so that there is no data collision. Each time the data transmission is executed, it is required to confirm if there is no data collision, which takes some time for the data transmission.

FIG. 8 shows a typical frame exchange sequence of related art illustrating the data transmission between a communication apparatus 90-1 and a communication apparatus 90-2 by using a radio signal. When transmission data DT-1 is supplied, the communication apparatus 90-1 judges whether or not a wireless communication line is idle. If it is judged that the wireless communication line is idle and data collision will not occur, the communication apparatus 90-1 transmits a radio signal SR-IT generated based upon the transmission data DT-1. Receiving the radio signal SR-1T, the communication apparatus 90-2 outputs reception data DR-1 (=DT-1) obtained based upon the received radio signal SR-1T. After the completion of reception of the radio signal SR-1T, the communication apparatus 90-2 also generates and transmits a radio signal SR-1R for a confirmation response indicating that the radio signal SR-1T has been received. Receiving the radio signal SR-1R, the communication apparatus 90-1 can judge that the transmission data DT-1 has been transmitted to the communication apparatus 90-2. After it is judged that the transmission data DT-1 has been transmitted to the communication apparatus 90-2, the communication apparatus 90-1 outputs a transmission completion notice RP-1 to the supply source of the transmission data DT-1.

For example, if transmission data DT-2 is supplied to the communication apparatus 90-2 during the transmission process for the transmission data DT-1, the communication apparatus 90-2 judges after the completion of transmission of the radio signal SR-1R whether the wireless communication line is idle. If it is judged that the wireless communication line is idle, the communication apparatus 90-2 transmits a radio signal SR-2T generated based upon the transmission data DT-2. Receiving the radio signal SR-2T, the communication apparatus 90-1 outputs reception data DR-2 (=DT-2) obtained based upon the received radio signal SR-2T. After the completion of reception of the radio signal SR-2T, the communication apparatus 90-1 generates and transmits a radio signal SR-2R for a confirmation response indicating the radio signal SR-2T has been received. Receiving the radio signal SR-2R, the communication apparatus 90-2 can judge that the transmission data DT-2 has been transmitted to the communication apparatus 90-1. After it is judged that the transmission data DT-2 has been transmitted to the communication apparatus 90-1, the communication apparatus 90-2 outputs a transmission completion notice RP-2 to a supply source of the transmission data DT-2.

In this manner, since the radio signal SR-2T is transmitted from the communication apparatus 90-2 after it is confirmed that there is no data collision, a process time MT to confirm that there is no data collision, is required each time a radio signal is transmitted, which takes some time for data transmission.

Even if a piggyback packet is generated including the information of a physical layer itself, transmission line characteristics of a communication network and the like, it is necessary to confirm that there is no data collision, if the piggyback packet or transmission data is transmitted. Accordingly, the data transmission cannot be executed efficiently.

Accordingly, it is desirable to provide a communication apparatus, a communication system, a communication method and/or a program, capable of executing an efficient data transmission by allowing piggybacked transmission data and confirmation response to be transmitted. The present invention addresses the above-identified, and other issues associated with technologies of the related art.

A communication apparatus according to an embodiment of the present invention for performing half duplex communications has: data storage means for storing transmission data; transmission processing means for generating a transmission frame; transmission/reception means for outputting as a transmission signal the transmission frame generated by the transmission processing means and generating a reception frame by receiving a transmission signal; and transmission/reception managing means for, if a confirmation response to the reception of the transmission signal at the transmission/reception means is to be issued and if the transmission data is stored in the data storage means, making the transmission processing means generate a transmission frame containing the transmission data in the confirmation response and supply the transmission frame to the transmission/reception means.

In a communication system according to an embodiment of the present invention for performing half duplex communications among a plurality of communication apparatuses, a communication apparatus which receives a transmission signal output from another communication apparatus has: data storage means for storing transmission data; transmission processing means for generating a transmission frame; transmission/reception means for outputting as a transmission signal the transmission frame generated by the transmission processing means and generating a reception frame by receiving a transmission signal; and transmission/reception managing means for, if a confirmation response to the reception of the transmission signal at the transmission/reception means is to be issued and if the transmission data is stored in the data storage means, making the transmission processing means generate a transmission frame containing the transmission data in the confirmation response and supply the transmission frame to the transmission/reception means.

A communication method according to an embodiment of the present invention includes the steps of: receiving a transmission signal; judging whether or not transmission data is stored; and, if a confirmation response to the reception of the transmission signal at the receiving step is to be issued and if the judging step judges that the transmission data is stored, generating a transmission frame containing the transmission data in the confirmation response and transmitting the transmission frame.

A program according to an embodiment of the present invention makes a computer execute: a reception step of receiving a transmission signal; a judgment step of judging whether transmission data is stored; and a transmission step of, if a confirmation response to the reception of the transmission signal at the reception step is to be issued and if the judgment step judges that the transmission data is stored, generating a transmission frame containing the transmission data in the confirmation response and transmitting the transmission frame.

According to the embodiments of the present invention, for example, if half duplex communications using a radio signal are to be performed, if a radio signal is received and a confirmation response to the reception is to be issued and if transmission data is already stored, a transmission frame containing the transmission data in the confirmation response is generated and transmitted before a wireless communication line is identified as idle. Reception data is extracted from a reception frame obtained from a received radio signal and thereafter stored.

According to the embodiments of the present invention, if a confirmation response to the reception of a transmission signal is to be issued and it is judged that transmission data is already stored, a transmission frame containing the transmission data in the confirmation response is generated and transmitted. Therefore, since the confirmation response and transmission data can be transmitted by one transmission frame, the sequence procedure for data transmission can be reduced and efficient data transmission becomes possible.

A radio signal may be used as the transmission signal, and the transmission frame containing the transmission data in the confirmation response may be transmitted before a wireless communication line is identified as idle. It is therefore possible to transmit the transmission data before the wireless communication line is identified as idle.

The destination of transmission data may be used as the destination of the transmission frame containing the transmission data in the confirmation response. Therefore, even if the first communication apparatus waiting for the confirmation response is different from the second communication apparatus which is the destination of the transmission data, the first communication apparatus can confirm correct transmission because the confirmation response is transmitted before the wireless communication line is identified as idle. Since the destination of a reception frame obtained from a received radio signal may be destined for the second communication apparatus, it can acquire the reception data in accordance with the received radio signal.

Since the reception data may be extracted from the reception frame and thereafter stored, even if the reception occurs while transmission data is supplied from an external apparatus, the received reception data can be supplied to the external apparatus after the transmission data is supplied.

BRIEF DESCRIPTION OF THE DRAWINGS

The above and other objects, features and advantages of embodiments of the present invention will become more apparent from the following description of the presently exemplary embodiment of the invention taken in conjunction with the accompanying drawings, in which:

FIG. 5 is a diagram showing an example of a structure of a MAC frame;

FIG. 6 is a diagram showing another example of the structure of the communication apparatus;

DETAILED DESCRIPTION OF EMBODIMENTS

Figure 1:
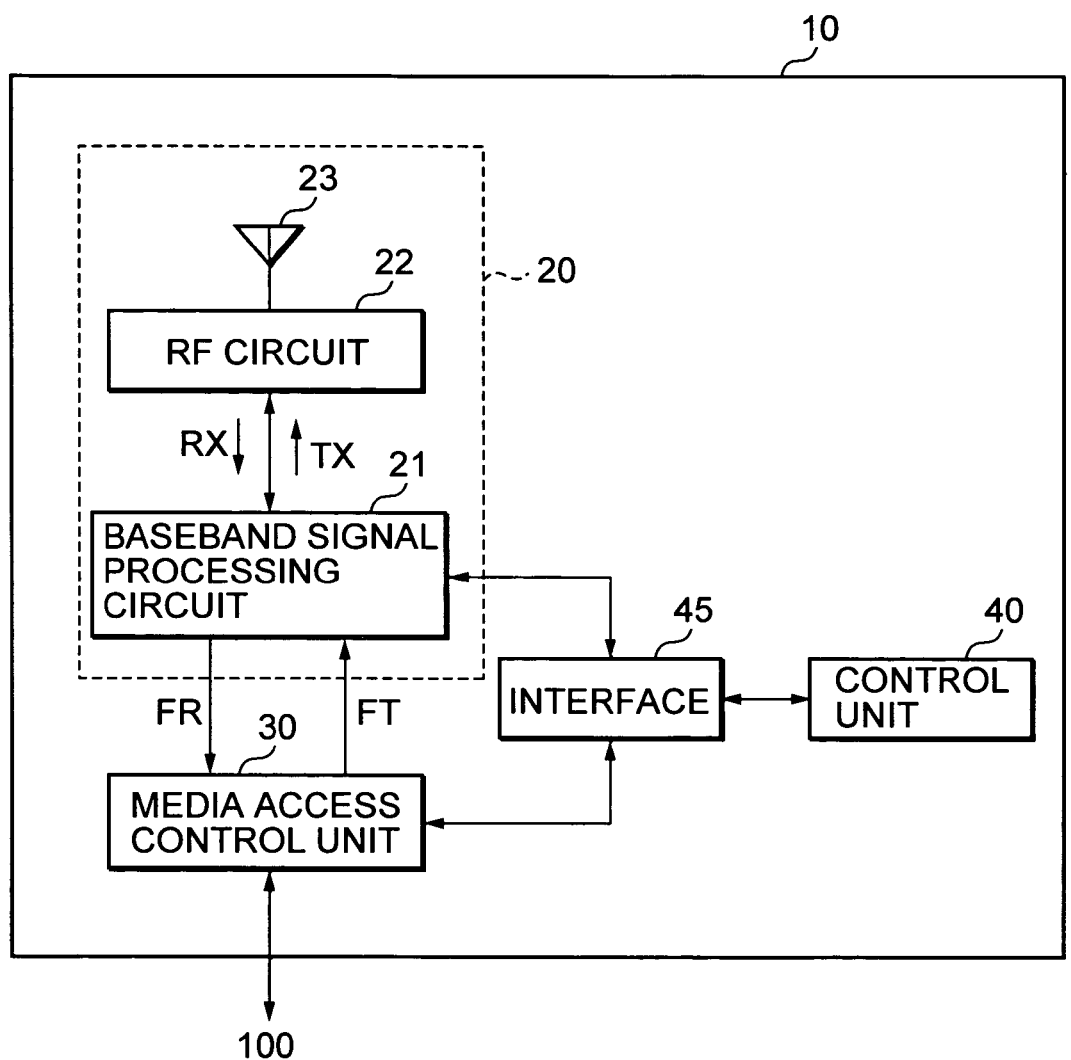
FIG. 1 is a diagram showing an example of a structure of a communication apparatus.

With reference to the drawings, embodiments of the present invention will be described. A communication system is constituted of a plurality of communication apparatuses, and each communication apparatus performs half duplex communications. FIG. 1 shows the structure of a communication apparatus 10.

The communication apparatus 10 has a transmission/reception unit 20, a media access controller (MAC: Media Access Controller) unit 30, a control unit 40 and an interface 45. The following description will be given, assuming that the communication apparatus 10 uses, for example, a wireless communication line as a transmission path for half duplex communications corresponding to specifications of IEEE (Institute of Electrical and Electronics Engineers) 802.11.

A baseband signal processing circuit 21 of the transmission/reception unit 20 modulates a transmission frame FT supplied from the media access controller unit 30 by a modulation method such as DQPSK (Differential Quaternary Phase Shift Keying) to generate a primary modulated signal. The primary modulated signal is subjected to spectrum spreading and a CCK (Complementary Code Keying) modulation process to generate a transmission signal TX which is supplied to an RF circuit 22. The RF circuit 22 up-converts and amplifies the transmission signal TX supplied from the baseband signal processing circuit 21, and transmits it from an antenna 23 as a radio signal in a 2.4 GHz band.

The baseband signal processing circuit 21 also divides the transmission frame FT supplied from the media access controller unit 30 into frames corresponding in number to the number of sub-carriers, and modulates each divided frame by a modulation method such as BPSK (Binary Phase Shift Keying) and QPSK (Quaternary Phase Shift Keying) to generate modulated signals corresponding in number to the number of sub-carriers. The modulated signals corresponding in number to the number of sub-carriers are used to generate a transmission signal TX of an OFDM (Orthogonal Frequency Division Multiplexing) type which signal is supplied to the RF circuit 22. The RF circuit 22 up-converts and amplifiers the transmission signal TX supplied from the baseband signal processing circuit 21 and transmits it from the antenna 23 as a radio signal in 5 GHz band.

Upon reception of a radio signal transmitted from another communication apparatus at the antenna 23, the RF circuit 22 down-converts the received radio signal to generate a reception signal RX which is supplied to the baseband signal processing circuit 21. The baseband signal processing circuit 21 performs a demodulation process and the like for the reception signal RX supplied from the RF circuit 22 to generate a reception frame FR which is supplied to the media access controller unit 30.

If the transmission/reception unit 20 can transmit the transmission frame FT by using a radio signal and generate the reception frame FR by receiving a radio signal, the modulation/demodulation process and the frequency band used by the radio signal are not limited to the above-described processes and frequency bands.

The media access controller unit 30 adds header information of addresses of a destination and a source of transmission data DT and an FCS (Frame Check Sequence) which is a bit train for error detection, to the transmission data DT supplied from an external apparatus 100, to thereby generate the transmission frame FT which is supplied to the baseband signal processing circuit 21. The media access controller unit 30 also performs error detection of the reception frame FR supplied from the baseband signal processing circuit 21, by using FCS, extracts reception data DR from the reception frame FR, and supplies the correct reception data DR to the external apparatus 100. The media access controller unit 30 also performs transmission timing control of the transmission frame FT in order to avoid frame collision during data transmission.

The control unit 40 communicates with the baseband signal processing circuit 21 and media access controller unit 30 via the interface 45 to thereby control the operations of the baseband signal processing circuit 21 and media access controller unit 30. For example, the control unit 40 performs settings for the modulation/demodulation process to be executed at the baseband signal processing circuit 21, settings for the operation to be executed at the media access controller unit 30, and other operations.

Figure 2:
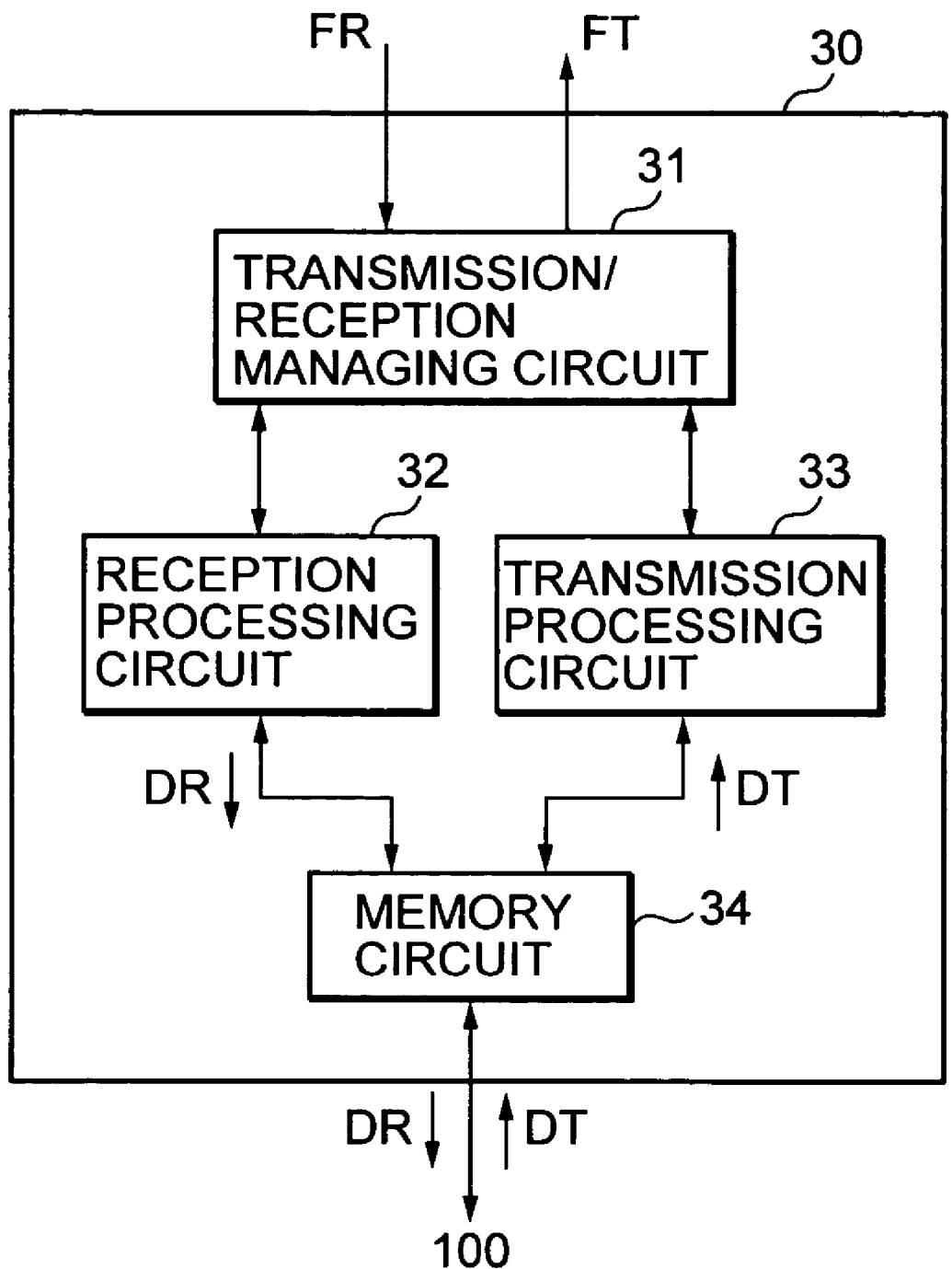
FIG. 2 is a diagram showing an example of a structure of a media access controller unit.

FIG. 2 shows the structure of the media access controller unit 30. A transmission/reception managing circuit 31 switches between frame transmission and reception and controls frame transmission timings. When the transmission/reception managing circuit 31 transmits a confirmation response and if it is judged, from a transmission request supplied from a transmission processing circuit 33 to be described later, that transmission data DT is stored in a memory circuit 34 to be described later, the transmission/reception managing circuit 31 makes the transmission processing circuit 33 generate a transmission frame FT containing the confirmation response and transmission data DT, by piggybacking the transmission data DT on the confirmation response to generate the transmission frame. This transmission frame is supplied to the baseband processing circuit 21.

A reception processing circuit 32 performs error correction by using FCS added to the reception frame FR, extracts correct reception data DR from the reception frame FR and stores it in the memory circuit 34. When the transmission data DT is stored in the memory circuit 34, the transmission processing circuit 33 notifies the transmission/reception managing circuit 31 of a transmission request for the transmission data DT stored in the memory circuit 34. The transmission processing circuit 33 reads the transmission data DT from the memory circuit 34, and adds header information and FCS to the transmission data DT to generate the transmission frame FT.

The memory circuit 34 stores transmission data DT supplied from the external apparatus 100, and in response to a request from the transmission processing circuit 33, supplies the stored transmission data DT to the transmission processing circuit 33. The memory circuit 34 also stores reception data DR supplied from the reception processing circuit 32. The memory circuit 34 also notifies the external apparatus 100 of that the reception data DR is stored, and in response to a request or the like from the external apparatus, supplies the stored reception data DR to the external apparatus 100.

Figure 3:
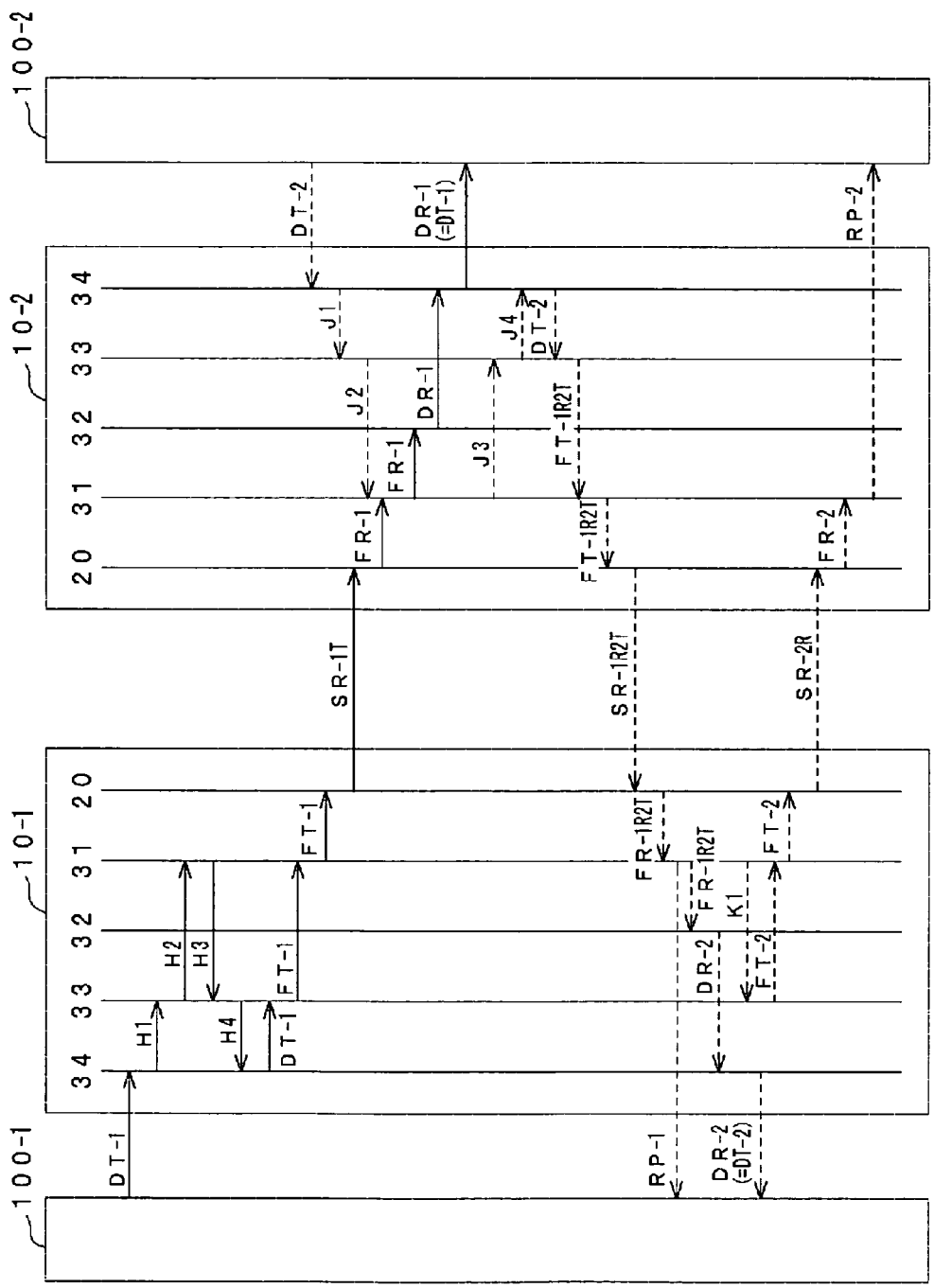
FIG. 3 is a diagram illustrating an example of a frame exchange sequence.

Next, the operation of the communication apparatus 10 will be described. FIG. 3 illustrates a frame exchange sequence for data transmission, assuming that a communication apparatus 10-1 and a communication apparatus 10-2 use a radio signal as a transmission signal.

As transmission data DT-1 is supplied from an external apparatus 100-1 to the communication apparatus 10-1, the memory circuit 34 stores the supplied transmission data DT-1. The memory circuit 34 issues a notice Hi indicating that the transmission data DT-1 is stored, to the transmission processing circuit 33. Upon reception of this notice H1, the transmission processing circuit 33 issues a transmission request H2 to the transmission/reception managing circuit 31.

As the transmission processing circuit 33 issues the transmission request H2, the transmission/reception managing circuit 31 performs carrier sensing to judge whether the wireless communication line is idle or busy. If the transmission/reception managing circuit 31 judges that the wireless communication line is idle and data transmission is possible without any data collision, the transmission/reception managing circuit 31 issues a request H3 for a transmission frame to the transmission processing circuit 33. If the wireless communication line is busy, the transmission/reception managing circuit 31 stands by until the wireless communication line becomes idle.

When the request H3 for the transmission frame is issued from the transmission/reception managing circuit 31, the transmission processing circuit 33 issues a request H4 for transmission data to the memory circuit 34, adds header information and FCS to the transmission data DT-1 read from the memory circuit 34 to generate a transmission frame FT-1. With this header information, an MAC address of the communication apparatus 10-2 is used as the destination address and an MAC address of the communication apparatus 10-1 is used as a transmission source address.

The transmission/reception managing circuit 31 also supplies the transmission frame FT-1 generated by the transmission processing circuit 33 to the transmission/reception unit 20. The transmission/reception unit 20 transmits the transmission frame FT-1 as a radio signal SR-1T.

Figure 4:
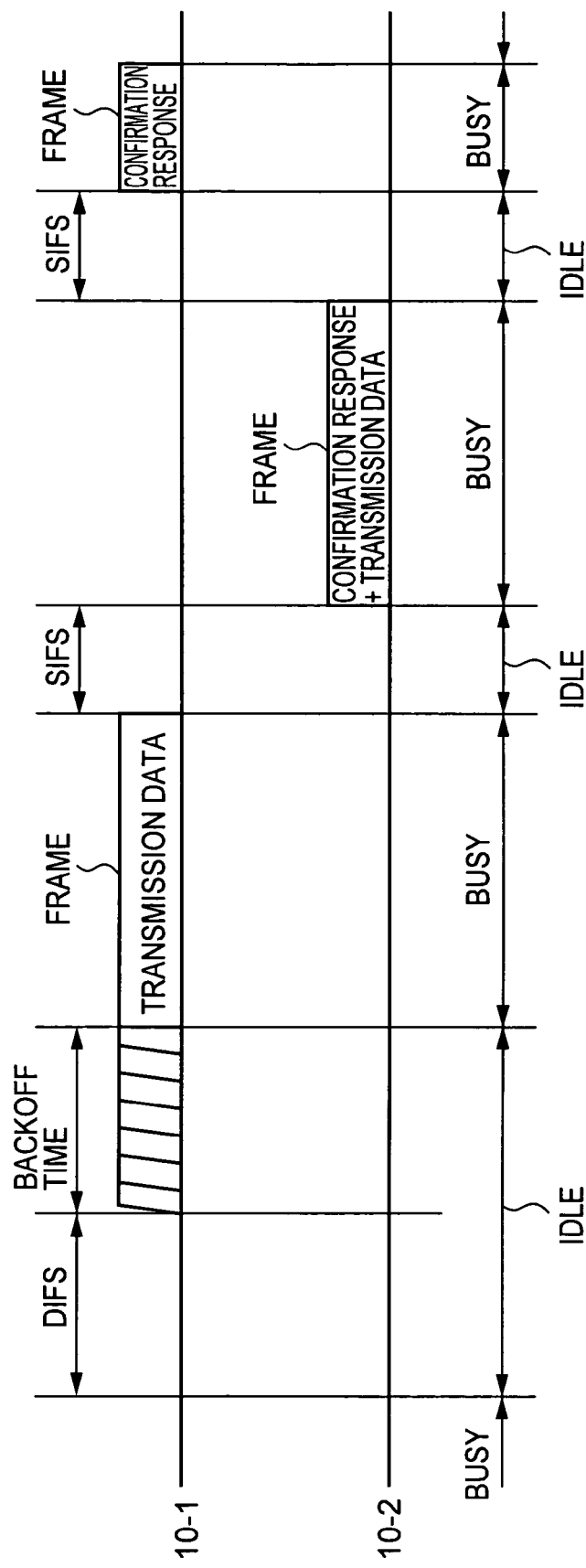
FIG. 4 is a diagram illustrating an example of a frame transmission timings.

FIG. 4 is a diagram illustrating frame transmission timings. After the transmission/reception managing circuit 31 detects a lapse of a DIFS (DCF Inter frame Space) time of the idle state of the wireless communication line, it further performs carrier sensing for a backoff time. If the wireless communication line is in the idle state until the backoff time lapses, it is judged that data transmission is possible without any data collision, and a radio signal is transmitted. If a radio signal is transmitted from another apparatus during the DIFS time or backoff time and the wireless communication line becomes busy, the transmission/reception managing circuit 31 stands by until the wireless communication line becomes idle.

The backoff time is a random time based on a random number, and a multiple of a slot time which is a constant time. The backoff time is reduced in the unit of slot time after the lapse of the DIFS time. If the wireless communication line becomes busy before the backoff time becomes "0", the remaining backoff time is left over until the next DIFS time lapses, and reduction in the left-over backoff time starts.

The communication apparatus 10-2 shown in FIG. 3 receives the radio signal SR-1T and supplies it to the transmission/reception unit 20, and supplies a reception frame FR-1 received at the transmission/reception unit 20 to the transmission/reception managing circuit 31. The transmission/reception managing circuit 31 confirms from the header information of the reception frame FR-1 that the reception frame FR-1 is the frame having as its destination the communication apparatus 10-2, i.e., the frame destined for its own, and supplies the reception frame to the reception processing circuit 32.

The reception processing circuit 32 performs error detection by using FCS added to the reception frame FR-1, extracts reception data DR-1 from the reception frame FR and supplies it to the memory circuit 34 to make the memory circuit 34 store the reception data DR-1. The memory circuit 34 supplies the stored reception data DR-1 to the external apparatus 100-2.

As transmission data DT-2 is supplied from the external apparatus 100-2 to the communication apparatus 10-2, the memory circuit 34 of the communication apparatus 10-2 stores the transmission data DT-2 and issues a notice J1 to the transmission processing circuit 33, the notice indicating that the transmission data DT-2 has been stored. In response to this notice J1, the transmission processing circuit 33 issues a transmission request J2 to the transmission/reception managing circuit 31.

After the transmission request J2 is issued from the transmission processing circuit 33, the transmission/reception managing circuit 31 performs carrier sensing to judge whether the wireless communication line is idle or busy. If it is judged that the wireless communication line is idle, a request J3 for a transmission frame is issued to the transmission processing circuit 33. If it is judged that the wireless communication line is busy because the radio signal SR-1T is transmitted in a manner described above, the request J3 for the transmission frame is issued after the wireless communication line becomes idle.

Since the transmission/reception managing circuit 31 has received the radio signal SR-1T destined for its own, the transmission/reception managing circuit 31 performs a confirmation response to the reception of the radio signal SR-LT. If the transmission request J2 has been issued from the transmission processing circuit 33 before the confirmation response, the transmission/reception managing circuit 31 issues the request J3 for the transmission frame so that the reception data DT-2 is piggybacked on the confirmation response to generate a transmission frame FT-1R2T which contains the confirmation response and transmission data DT-2 and is supplied to the transmission/reception unit 20.

As the request J3 of this type is supplied from the transmission/reception managing circuit 31 to the transmission processing circuit 33, the transmission processing circuit 33 issues a request J4 for the transmission data DT-2 to the memory circuit 34, and piggybacks the transmission data DT-2 read from the memory circuit 34 on the confirmation response in the manner described above to generate the transmission frame FT-1R2T and transmit it to the transmission/reception unit 20. The transmission frame piggybacking the confirmation response and transmission data can be identified from a frame type and sub-type in the header information of the transmission frame.

FIG. 5 shows the structure of a MAC frame. As shown in FIG. 5A, the MAC frame is constituted of a MAC header, a data field and an FCS. The MAC header can be provided with: a frame control field containing various pieces of control information; a duration/ID field containing a reserved time duration for using a wireless communication line and a terminal identifier to be used in a power saving mode; address fields containing a destination address and a transmission source address, and a sequence control field containing a sequence number of the MAC frame and a fragment number for fragmentation.

As shown in FIG. 5B, the frame control field has information such as a protocol version indicating the version of a MAC protocol and the type and sub-type indicating that the MAC frame is a frame of which kind. The type in the frame control field indicates that the MAC frame is which one of a management frame, a control frame and a data frame. The sub-type further classifies the management frame, control frame and data frame. For example, for the frame of confirmation response, "01" is set to the type in the frame control field (MAC header bit positions B3 and B2), and "1101" is set to the sub-type (bit positions B7 to B4). For the frame of data, "10" is set to the type (bit positions B3 and B2), and "0000" is set to the sub-type (bit positions B7 to B4). When the confirmation response and transmission data are piggybacked, the type and sub-type are set indicating a data frame of both the data and confirmation response. Namely, "10" is set to the type (bit positions B3 and B2), and "0001" is set to the sub-type (bit positions B7 to B4).

As the header information of the transmission frame FT-1R2T, the MAC address of the communication apparatus 10-1 is used as the destination address, and the MAC address of the communication apparatus 10-2 is used as the transmission source address.

The transmission/reception unit 20 of the communication apparatus 10-2 transmits the transmission frame FT-1R2T as a radio signal SR-1R2T after the lapse of an SIFS (Short Inter frame Space) time after the completion of the radio signal SR-1T. This SIFS is set shorter than the DIFS time as shown in FIG. 4. It is therefore possible to prevent another frame transmission from being interposed before the transmission of the confirmation response frame.

The communication apparatus 10-1 receives the radio signal SR-1R2T and supplies a reception frame FR-1R2T obtained at the transmission/reception unit 20 to the transmission/reception managing circuit 31. The transmission/reception managing circuit 31 judges whether the reception frame FR-1R2T is a frame of the confirmation response. If it is judged that the reception frame FR-1R2T is a frame of the confirmation response, the transmission reception managing circuit 31 outputs, to the external apparatus 100-1 serving as the supply source of the transmission data DT-1, a signal PR-1 indicating that the transmission data DT-1 has been correctly transmitted. It is also judged, by using the header information of the reception frame FR-1R2T, whether the reception frame FR-1R2T is a frame destined for its own, having the communication apparatus 10-1 as the destination. If it is judged that the reception frame FR-1R2T is a frame destined for its own, it is further judged whether the reception frame FR-1R2T contains the transmitted data. If the reception frame FR-1R2T contains the transmitted data, the reception frame FR-1R2T is supplied to the reception processing circuit 32. The transmission/reception managing circuit 31 issues a request K1 for the transmission frame indicating the confirmation response to the radio signal SR-1R2T, to the transmission processing circuit 33. If the reception frame is not a frame having the communication apparatus 10-1 as a destination, the reception frame is discarded. If the reception frame is a frame destined for its own and does not contain data, a process is executed corresponding to the information indicated by the reception frame.

The reception processing circuit 32 of the communication apparatus 10-1 extracts reception data DR-2 from the reception frame FR-1R2T, supplies it to the memory circuit 34, and makes the memory circuit 34 store the reception data DR-2. The memory circuit 34 supplies the stored reception data DR-2 to the external apparatus 100-1. In this manner, since the reception data DR-2 is stored in the memory circuit 34, for example, even if the radio signal SR-1R2T is received while new transmission data DT-3 is supplied from the external apparatus 100-1 to the communication apparatus 10-1, the reception data DR-2 transmitted as the radio signal SR-1R2T can be read from the memory circuit 34 after the transmission data DT-3 is supplied.

In response to the request K1 from the transmission/reception managing circuit 31, the transmission processing circuit 33 generates a transmission frame FT-2 for the confirmation response to the radio signal SR-1R2T, and supplies it to the transmission/reception unit 20. The transmission/reception unit 20 transmits the transmission frame FT-2 as a radio signal SR-2 after the lapse of the SIFS time after the completion of the radio signal SR-1R2T.

The communication apparatus 10-2 receives the radio signal SR-2R and supplies a reception frame FR-2 obtained at the transmission/reception unit 20 to the transmission/reception managing circuit 31. The transmission/reception managing circuit 31 judges whether the reception frame FR-2 indicates the confirmation response from the communication apparatus 10-2. If it indicates the confirmation response, the transmission/reception managing circuit 31 outputs a signal PR-2 indicating that transmission of the transmission data DT-2 has been correctly completed, to the external apparatus 100-2 which is the supply source of the transmission data DT-2.

In this manner, the transmission/reception managing circuit 31 and transmission processing circuit 33 can transmit the transmission frame containing the transmission data in the confirmation response, after the lapse of the SIFS time. The DIFS time and backoff time taken to transmit the next frame after the confirmation response frame is transmitted, are not necessary so that efficient data transmission is possible.

If the destination of the transmission data DT-2 is a communication apparatus 10-3 different from the communication apparatus 10-1, the destination of the transmission frame FT-1R2T containing the transmission data in the confirmation response is set to the communication apparatus 10-3. In this case, the transmission/reception circuit 31 of the communication apparatus 10-1 transmits the signal PR-1 indicating that transmission of the transmission data DT-1 has been completed correctly, to the external apparatus 100-1 which is the supply source of the transmission data DT-1, irrespective of the destination of the reception frame, if the reception frame obtained from the received radio signal SR-1R2T after the lapse of the SIFS time after the completion of the radio signal SR-1T, indicates the confirmation response. Similar to the above-described communication apparatus 10-1, the communication apparatus 10-3 indicated as the destination of the reception frame outputs the reception data DR-2 to an external apparatus 100-3 connected to the communication apparatus 10-3. The communication apparatus 10-3 also generates and transmits a transmission frame of the confirmation response. In this manner, even if the transmission destination of the received data is different from the transmission destination of new data, the confirmation response and transmission data can be transmitted as one transmission frame without involving the DIFS time and backoff time.

The operations of the above-described transmission/reception managing circuit 31, reception processing circuit 32 and transmission processing circuit 33 can be realized not only by hardware but also by software. FIG. 6 shows another structure of the communication apparatus 60 which realizes the operation thereof by software. Connected via a bus 65 are a transmission/reception unit 20, a CPU 61, a ROM 62, a RAM 63 and a data input/output unit 64.

CPU 61 performs communication control by executing programs stored in ROM 62. ROM 62 stores programs for executing: a process of generating a transmission frame by using transmission data and transmitting it from the transmission/reception unit 20; a process of extracting reception data from a signal received at the transmission/reception unit 20; a process of transmitting a transmission frame of confirmation response when data destined for its own is received; and other processes. RAM 63 temporarily stores transmission data and reception data, and is also used as a working area to be used for communication control by CPU 61. The data input/output unit 64 is connected to an external apparatus, and transmission data supplied from the external apparatus is stored in RAM 63 via the data input/output unit 64. Reception data stored in RAM 63 is output to the external apparatus via the data input/output unit 64.

Figure 7:
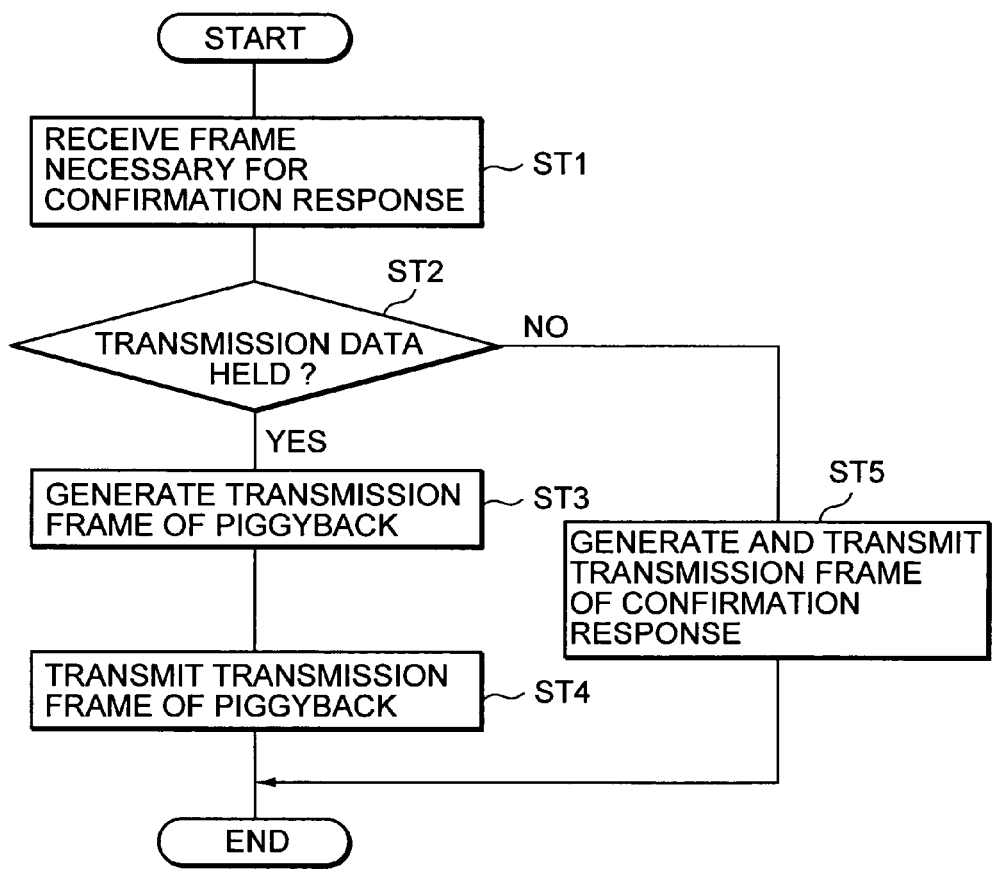
FIG. 7 is a flow chart illustrating an example of a communication operation of a communication apparatus.
Figure 8:
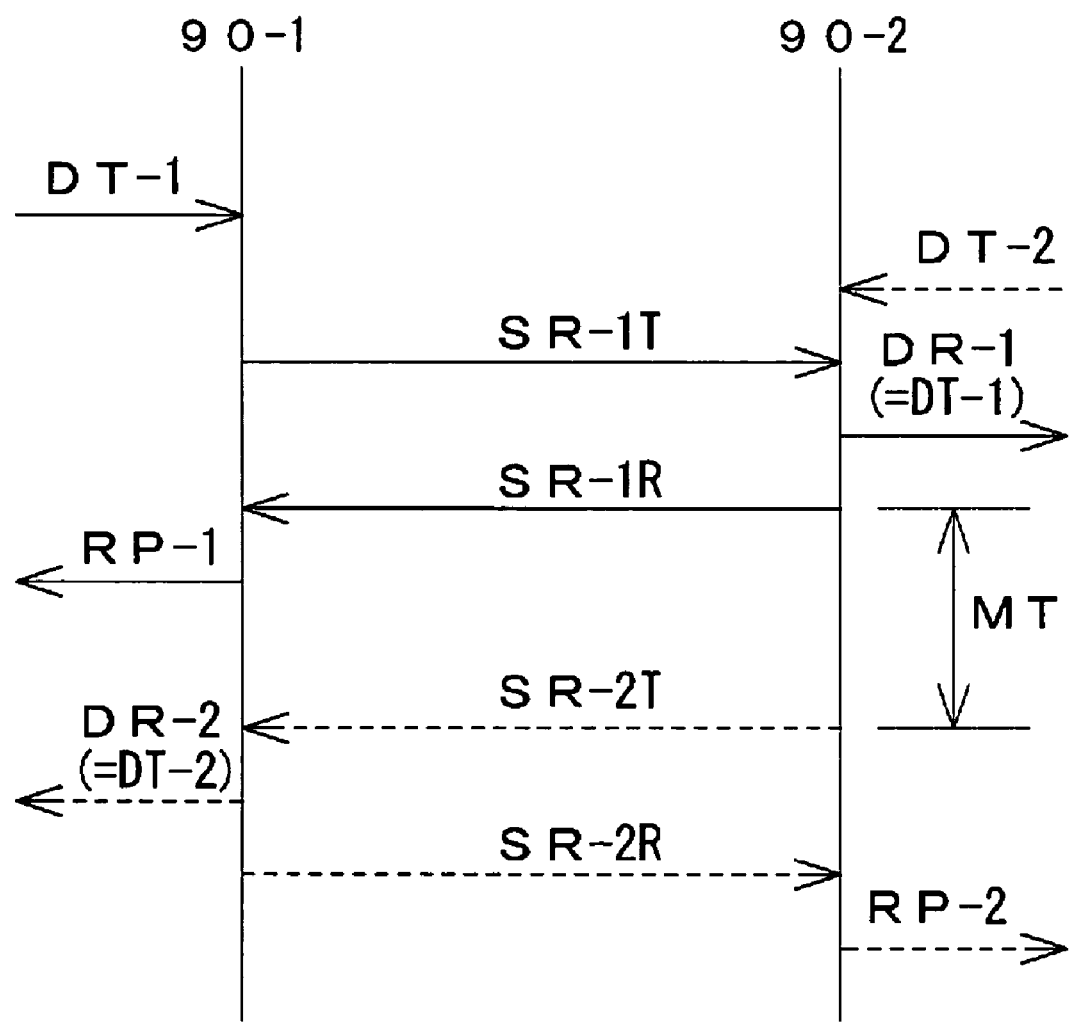
FIG. 8 is a diagram illustrating an example of a frame exchange sequence of related art.

FIG. 7 is a flow chart illustrating the communication operation to be executed by the communication apparatus 60. At Step ST1, a frame necessary for a confirmation response, e.g., a data frame, is received to thereafter advance to Step ST2. In this case, at Step ST1, CPU 61 makes RAM 63 store the reception data contained in the received frame.

At Step ST2, CPU 61 judges whether transmission data is stored. If the transmission data is stored in RAM 63, the flow advances to Step ST3, whereas if not, the flow branches to Step ST5.

At Step ST3, CPU 61 generates a piggyback transmission frame by containing the transmission data stored in RAM 63 in the confirmation response to the reception of the frame at Step ST1, to thereafter advance to Step ST4. At Step ST4, CPU 61 makes the transmission/reception unit 20 transmit the generated piggyback transmission frame. At Step ST5, CPU 61 generates a transmission frame of the confirmation response to the reception of the frame at Step ST1, and transmits it from the transmission/reception unit 20.

A radio signal of a confirmation response frame or a piggyback frame of the confirmation response and transmission data is transmitted after the lapse of the SIFS time as described above. By using the destination of transmission data as the destination of the radio signal having the confirmation response and transmission data, the radio signal can be transmitted as one transmission frame of the confirmation response and transmission data as described above, even if the transmission source of the received data is different from the transmission destination of new data.

As described above, by executing the processes shown in FIG. 7 by software, the transmission data is piggybacked on the confirmation response and efficient data transmission is possible. A communication apparatus which performs a communication operation. by software can perform data transmission by changing the software without changing the hardware. In the above-described embodiment, although wireless communication by half duplex communications indicated by the specifications of IEEE802.11 has been described, the present invention is not limited to the above-described embodiment, but a data transmission scheme can be used which adopts the half duplex communications and transmits a confirmation response frame.

As described so far, the present embodiment is practically useful if half duplex communications are performed while a reception confirmation response is performed, and suitable for data transmission using a radio signal.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus for performing half duplex communications, the communication apparatus comprising:
   data storage means for storing transmission data; transmission processing means for generating a transmission frame;
   transmission/reception means for outputting as a transmission signal the transmission frame generated by the transmission processing means and generating a reception frame by receiving a transmission signal; and
   transmission/reception managing means for, if a confirmation response to the reception of the transmission signal at the transmission/reception means is to be issued and if the transmission data is stored in the data storage means, making the transmission processing means generate a transmission frame containing the transmission data in the confirmation response and supply the transmission frame to the transmission/reception means.

2. The communication apparatus according to claim 1, wherein the transmission/reception means uses radio signal as the transmission signal, and transmits the transmission frame containing the transmission data in the confirmation response before a wireless communication line is identified as idle.

3. The communication apparatus according to claim 2, wherein the transmission/reception means uses the destination of transmission data as the destination of the transmission frame containing the transmission data in the confirmation response.

4. The communication apparatus according to claim 1, further comprising: reception processing means for extracting reception data from a reception frame received by the transmission/reception means, and making the data storage means store the reception frame.

5. A communication system for performing half duplex communications among a plurality of communication apparatuses, wherein a communication apparatus receiving a transmission signal output from another communication apparatus comprises:
   data storage means for storing transmission data;
   transmission processing means for generating a transmission frame;
   transmission/reception means for outputting as a transmission signal the transmission frame generated by the transmission processing means and generating a reception frame by receiving a transmission signal; and
   transmission/reception managing means for, if a confirmation response to the reception of the transmission signal at the transmission/reception means is to be issued and if the transmission data is stored in the data storage means, making the transmission processing means generate a transmission frame containing the transmission data in the confirmation response and supply the transmission frame to the transmission/reception means.

6. The communication system according to claim 5, wherein the transmission/reception means uses a radio signal as the transmission signal, and transmits the transmission frame containing the transmission data in the confirmation response before a wireless communication line is identified as idle.

7. The communication system according to claim 6, wherein the transmission/reception means uses the destination of transmission data as the destination of the transmission frame containing the transmission data in the confirmation response.

8. The communication system according to claim 5, wherein the communication apparatus further comprises: reception processing means for extracting reception data from a reception frame received by the transmission/reception means, and making the data storage means store the reception frame.

9. A communication method comprising the steps of:
   receiving a transmission signal;
   judging whether or not transmission data is stored; and
   generating and transmitting a transmission frame containing the transmission data in the confirmation response if a confirmation response to the reception of the transmission signal at the receiving step is to be issued and if the judging step judges that the transmission data is stored.

10. The communication method according to claim 9, wherein
    a radio signal is used as the transmission signal, and
    the transmission frame containing the transmission data in the confirmation response is transmitted before a wireless communication line is identified as idle in the transmitting step.

11. The communication method according to claim 10, wherein, in the transmitting step, the destination of transmission data is used as the destination of the transmission frame containing the transmission data in the confirmation response.

12. The communication method according to claim 9, the method further comprising the step of: extracting reception data from a reception frame obtained by receiving the transmission signal by the receiving step, and storing the reception data.

13. A computer-readable medium storing thereon computer-executed instructions when executed by a computer control the computer to execute a method comprising:
    a reception step of receiving a transmission signal;
    a judgment step of judging whether transmission data is stored; and
    a transmission step of, if a confirmation response to the reception of the transmission signal at the reception step is to be issued and if the judgment step judges that the transmission data is stored, generating a transmission frame containing the transmission data in the confirmation response and transmitting the transmission frame.

14. A communication apparatus for performing half duplex communications, the communication apparatus comprising:
    a memory circuit storing transmission data;

a transmission processing circuit generating a transmission frame;

a transmission/reception processing circuit outputting as a transmission signal the transmission frame generated by the transmission processing circuit and generating a reception frame by receiving a transmission signal; and a transmission/reception managing circuit making the transmission circuit generate a transmission frame containing the transmission data in the confirmation response and supply the transmission frame to the transmission/reception processing circuit if a confirmation response to the reception of the transmission signal at the transmission/reception processing circuit is to be issued and if the transmission data is stored in the memory circuit.

* * * * *